United States Patent
Tiwari

(10) Patent No.: US 8,798,002 B2
(45) Date of Patent: Aug. 5, 2014

(54) METHOD OF SENDING NETWORK CONFIGURATION AND RELATED COMMUNICATION DEVICE

(75) Inventor: Kundan Tiwari, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 74 days.

(21) Appl. No.: 13/249,224

(22) Filed: Sep. 29, 2011

(65) Prior Publication Data

US 2012/0082133 A1 Apr. 5, 2012

Related U.S. Application Data

(60) Provisional application No. 61/387,994, filed on Sep. 30, 2010.

(51) Int. Cl.
*H04W 4/00* (2009.01)
*H04J 3/16* (2006.01)

(52) U.S. Cl.
USPC .......................................... 370/331; 370/466

(58) Field of Classification Search
USPC ................................................ 370/331, 466
See application file for complete search history.

(56) References Cited

U.S. PATENT DOCUMENTS

| | | | |
|---|---|---|---|
| 7,535,882 B2 | 5/2009 | Kim | |
| 2002/0099787 A1* | 7/2002 | Bonner et al. | 709/216 |
| 2005/0163106 A1 | 7/2005 | Vaittinen | |
| 2006/0281459 A1 | 12/2006 | Marinescu | |
| 2007/0223420 A1* | 9/2007 | Hori et al. | 370/331 |
| 2009/0103468 A1* | 4/2009 | Kasapidis | 370/312 |
| 2009/0196266 A1* | 8/2009 | Wu et al. | 370/338 |
| 2009/0233548 A1* | 9/2009 | Andersson et al. | 455/41.2 |
| 2010/0124191 A1* | 5/2010 | Vos et al. | 370/328 |
| 2012/0225660 A1* | 9/2012 | Pedersen et al. | 455/446 |
| 2012/0243486 A1* | 9/2012 | Zeira et al. | 370/329 |
| 2012/0282956 A1* | 11/2012 | Kim et al. | 455/466 |
| 2013/0017829 A1* | 1/2013 | Kim et al. | 455/435.1 |
| 2013/0051228 A1* | 2/2013 | Kim et al. | 370/230 |
| 2013/0130684 A1* | 5/2013 | Gomes et al. | 455/435.1 |

FOREIGN PATENT DOCUMENTS

| | | |
|---|---|---|
| EP | 2061192 A1 | 5/2009 |
| JP | 2009504091 A | 1/2009 |
| JP | 2010273339 A | 12/2010 |
| KR | 1020070043981 A | 4/2007 |
| KR | 1020100092015 A | 8/2010 |
| WO | 2007019090 A1 | 2/2007 |

OTHER PUBLICATIONS

European patent application No. 11007983.7, European Search Report mailing date: Dec. 2, 2011.
3GPP TR 23.888 V0.5.1(Jul. 2010), "3rd Generation Partnership Project; Technical Specification Group Services and System Aspects; System Improvements for Machine-Type Communications; (Release 10)", XP050458398, p. 1-75.

(Continued)

*Primary Examiner* — Andrew Lee
(74) *Attorney, Agent, or Firm* — Winston Hsu; Scott Margo

(57) ABSTRACT

A method of sending a network configuration of a network in a wireless communication system is disclosed. The method comprises sending the network configuration in a dedicated message to a mobile station (MS), wherein the network configuration is specific for a machine type communication (MTC) device.

6 Claims, 4 Drawing Sheets

(56) References Cited

OTHER PUBLICATIONS

Office Action mailed on Dec. 4, 2012 for the Japanese application No. 2011-218487, filing date Sep. 30, 2011, pp. 1-2.
3GPP TSG SA WG2 Meeting #80; CR S2-104260, "NMO=I for MTC devices and NMO=II for other mobiles", Aug. 30, 2010.
3GPP TS 25.331 V9.0.0 (Sep. 2009) Technical Specification 3rd Generation Partnership Project; Technical Specification Group Radio Access Network; Radio Resource Control (RRC); Protocol Specification (Release 9).
Vodafone, "NMO=I for MTC devices and NMO=II for other mobiles", Change Request 23.060 CR 1159 rev 2 current version: 10.0.0, 3GPP TSG SA WG2 Meeting #80, S2-104260 rev of S2-104036, Aug. 30-Sep. 3, 2010, Brunstad, Norway.
Office Action mailed on Jun. 26, 2013 for the Korean Application No. 10-2011-0099984, filing date Sep. 30, 2011, pp. 1-4.
3GPP TR 23.888 V1.0.0 (Jul. 2010), p. 25-26, 45-47.
Office action mailed on Oct. 4, 2013 for Taiwan application No. 100135648, filing date Sep. 30, 2011, p. 1-6.

* cited by examiner

METHOD OF SENDING NETWORK CONFIGURATION AND RELATED COMMUNICATION DEVICE

CROSS REFERENCE TO RELATED APPLICATIONS

This application claims the benefit of U.S. Provisional Application No. 61/387,994 filed on Sep. 30, 2010 and entitled "Method to communicate the network configuration parameters to the MTC devices", the contents of which are incorporated herein.

BACKGROUND OF THE INVENTION

1. Field of the Invention

The application relates to a method and a related communication device used in a wireless communication system and related communication device, and more particularly, to a method and a related communication device of sending a network configuration in a wireless communication system.

2. Description of the Prior Art

Machine-type communication (MTC) is one type of data communication including one or more entities not requiring human interactions. That is, the MTC refers to the concept of communication based on a network such as the existing GERAN, UMTS, long-term evolution (LTE), or the like used by a machine device instead of a mobile station (MS) used by a user. The machine device used in the MTC can be called an MTC device. There are various MTC devices such as a vending machine, a machine of measuring a water level at a dam, etc. That is, the MTC is widely applicable in various fields. The MTC device has features different from that of a typical MS. Therefore, a service optimized to the MTC may differ from a service optimized to human-to-human communication. In comparison with a current mobile network communication service, the MTC can be characterized as a different market scenario, data communication, less costs and efforts, a potentially great number of MSs for communication, wide service areas, low traffic per MS, etc.

Meanwhile, the number of MTC devices is expected to be much greater than the number of legacy devices, and a probability of performing operations of the plurality of MTC devices simultaneously is high due to a feature of atypical machine-to-machine (M2M) service. M2M communication (also referred to as "machine-type communications" or "MTC") may be used in a variety of areas. In the area of security, M2M communication may be used in surveillance systems, in backup of telephone landlines, in the control of physical accesses (e.g. to buildings), and in car/driver security. In the area of tracking and tracing, M2M communication may be used for fleet management, order management, Pay As You Drive (PAYD) applications, asset tracking, navigation, traffic information applications, road tolling, traffic optimization, and steering. In the area of payment systems, M2M communication may be used in point of sales, vending machines, customer loyalty applications, and gaming machines. In healthcare, M2M communication may be used for remotely monitoring vital signs, supporting the elderly or handicapped, in web access telemedicine points, and in remote diagnostics. In the area of remote maintenance/control, M2M communication may be used in programmable logic controllers (PLCs), sensors, lighting, pumps, valves, elevator control, vending machine control, and vehicle diagnostics. In the area of metering, M2M communication may be used in applications related to power, gas, water, heating, grid control, and industrial metering. Additionally, M2M communication based on machine type communication (MTC) technology may be used in areas such as customer service.

Depending on its implementation, M2M communication may be different from some current communication models. For example, M2M communication may involve new or different market scenarios. M2M communications may also differ from some current technologies in that M2M communication may involve a large number of wireless transmit/receive units (WTRUs), and/or may involve very little traffic per WTRU. Additionally, relative to some current technologies, M2M communication may involve lower costs and less effort to deploy. M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), Long Term Evolution Advanced (LTE-Advanced), and/or other technologies such as WiMAX (Worldwide Interoperability for Microwave Access) or those developed by the Institute for Institute of Electrical and Electronics Engineers (IEEE) and 3GPP2. M2M communications may use networks based on these technologies to deliver business solutions in a cost-effective manner. In a circumstance involving ubiquitous deployment of wireless networks, the availability of the wireless networks may facilitate and/or encourage the deployment and use of M2M WTRUs. Additionally, further enhancements to these technologies may provide additional opportunities for the deployment of M2M-based solutions.

The 3GPP network may provide co-ordination of paging for circuit-switched and packet-switched services. Paging co-ordination means that the network sends paging messages for circuit-switched services on the same channel as used for packet-switched services, i.e. on the GPRS paging channel or on the GPRS traffic channel, and a MS (Mobile Station) needs only to monitor that channel. Three network operation modes are defined: Network operation mode I; Network operation mode II; Network operation mode III.

Network operation mode I: the network sends a CS paging message for a GPRS-attached MS, either on the same channel as the GPRS paging channel (i.e. the packet paging channel or the CCCH paging channel), or on a GPRS traffic channel. This means that the MS needs only to monitor one paging channel, and that it receives CS paging messages on the packet data channel when it has been assigned a packet data channel.

Network operation mode II: the network sends a CS paging message for a GPRS-attached MS on the CCCH paging channel, and this channel is also used for GPRS paging. This means that the MS needs only to monitor the CCCH paging channel, but that e.g. CS paging continues on this paging channel even if the MS has been assigned a packet data channel, unless BSS paging co-ordination as described in subclause 8.1.6 of 3GPP is active.

Network operation mode III: the network sends a CS paging message for a GPRS-attached MS on the CCCH paging channel, and sends a GPRS paging message on either the packet paging channel (if allocated in the cell) or on the CCCH paging channel. This means that an MS that wants to receive pages for both circuit-switched and packet-switched services shall monitor both paging channels in the cell, if the packet-paging channel is allocated. The core network performs no paging co-ordination. See, however, also subclause 8.1.6 of 3GPP for description of paging co-ordination on BSS level.

The network operation mode (I, II, or III) shall be indicated as system information to MSs. Additional system information can indicate that MSs configured for MTC shall use NMO I, regardless of what NMO is indicated by system information for other MSs. From these indications, the MS determines which mode applies to it. For proper operation, the mode of operation should be the same in each cell of a routing area. Based on the system information provided by the network, the MS can then choose, according to its capabilities, whether it can attach to GPRS services, to non-GPRS services, or to both.

According to the agreed CR S2-104260, the network may send a parameter in the system information to treat the network as NMO 1 when received by a device configured as MTC device. After reading this parameter the MTC device will treat the network as NMO I and perform procedure accordingly. It is mentioned that this information element is broadcasted in the system information.

However a GERAN/UMTS MS reads system information only in idle mode not in connected mode. Such MSs when handovers to another RA in connected mode (e.g. CS handover or SRNS relocation in CELL DCH state etc.) can't get this network configuration parameter and will not know if the new RA supports this feature or not for the MTC devices. So the behavior of the MTC device is indeterminate.

SUMMARY OF THE INVENTION

A method of sending a network configuration of a network in a wireless communication system is provided.

A method of sending a network configuration of a network in a wireless communication system is disclosed. The method comprises sending the network configuration in a dedicated message to a mobile station (MS), wherein the network configuration is specific for a machine type communication (MTC) device.

A communication device for sending a network configuration in a wireless communication system is disclosed. The communication device comprises means for sending the network configuration in a dedicated message to a mobile station (MS), wherein the network configuration is specific for a MTC device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
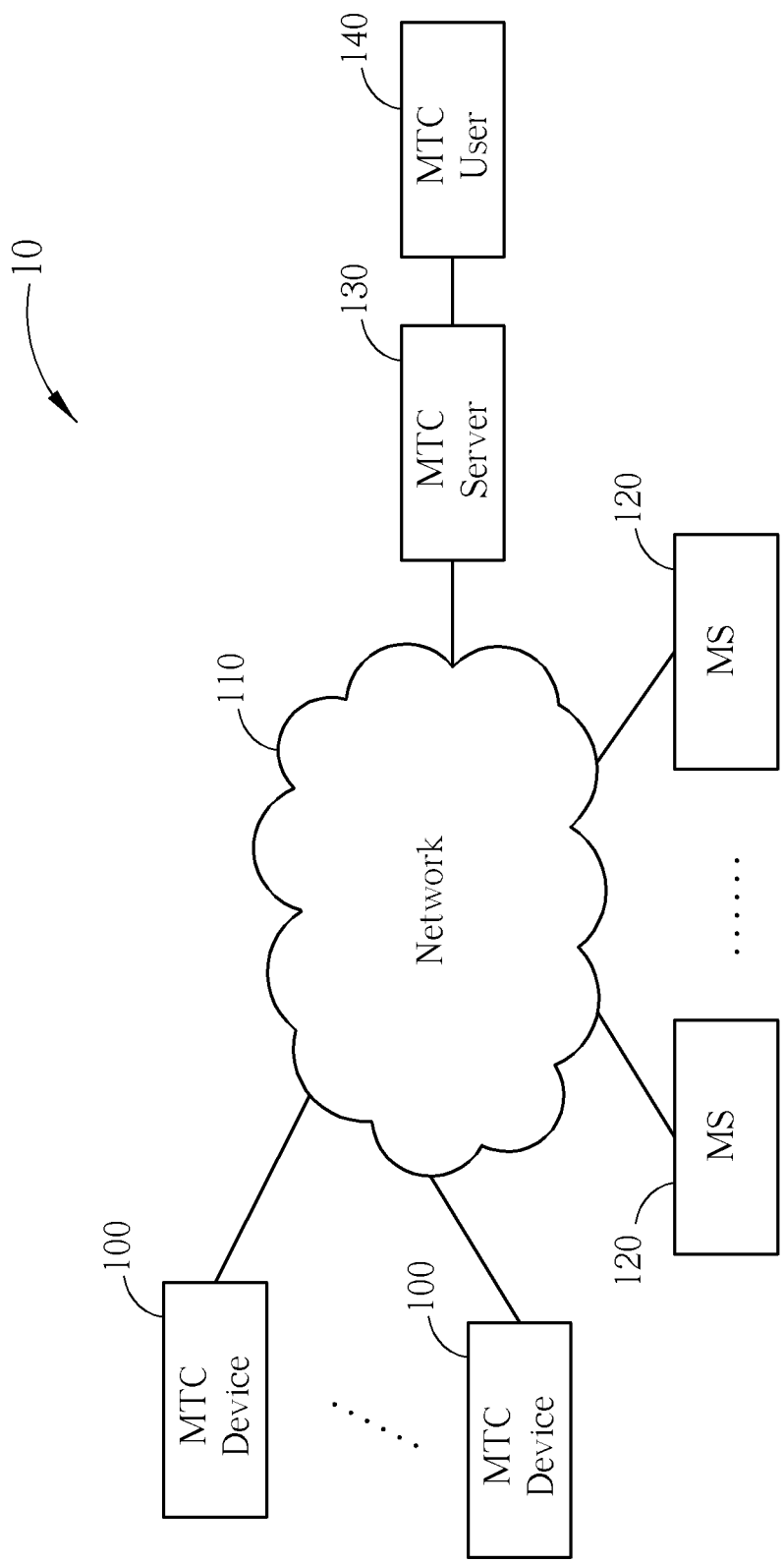
FIG. 1 is a machine type communication (MTC) architecture of a wireless communication system.

Please refer to FIG. 1, which illustrates an exemplary MTC ((Machine Type Communication) architecture of a wireless communication system 10. The wireless communication system 10 includes a plurality of MTC devices 100, a network 110, a plurality of mobile stations (MSs) 120, a MTC server 130 and a MTC user 140. The plurality MTC devices 100 and the plurality of MSs 120 are connected to the network 110. The MTC server 130 receives information of the MTC devices 100 through the network 110, and provides the information to the MTC user 140. The MTC server 130 is located outside of the network 110 or inside of the network 110 and managed by the network operator.

The network 110 may be referred as to Global System for Mobile Communications (GSM), Universal Mobile Telecommunications System (UMTS), GSM EDGE Radio Access Network (GERAN), Long Term Evolution (LTE), Long Term Evolution Advanced (LTE-Advanced), and/or other technologies such as WiMAX (Worldwide Interoperability for Microwave Access) or those developed by the Institute for Institute of Electrical and Electronics Engineers (IEEE). Please note that MTC devices 320 also can be referred as to user equipments (UEs) in a wireless communication system, which includes mobile phones, computer systems, etc.

The network 110 can send paging messages for circuit-switched (CS) service on the same channel as used for packet-switched service, i.e. on the GPRS paging channel or on the GPRS traffic channel, and the MSs 120 need only to monitor that channel. Three network operation modes are defined: Network operation mode I; Network operation mode II; Network operation mode III.

Figure 2:
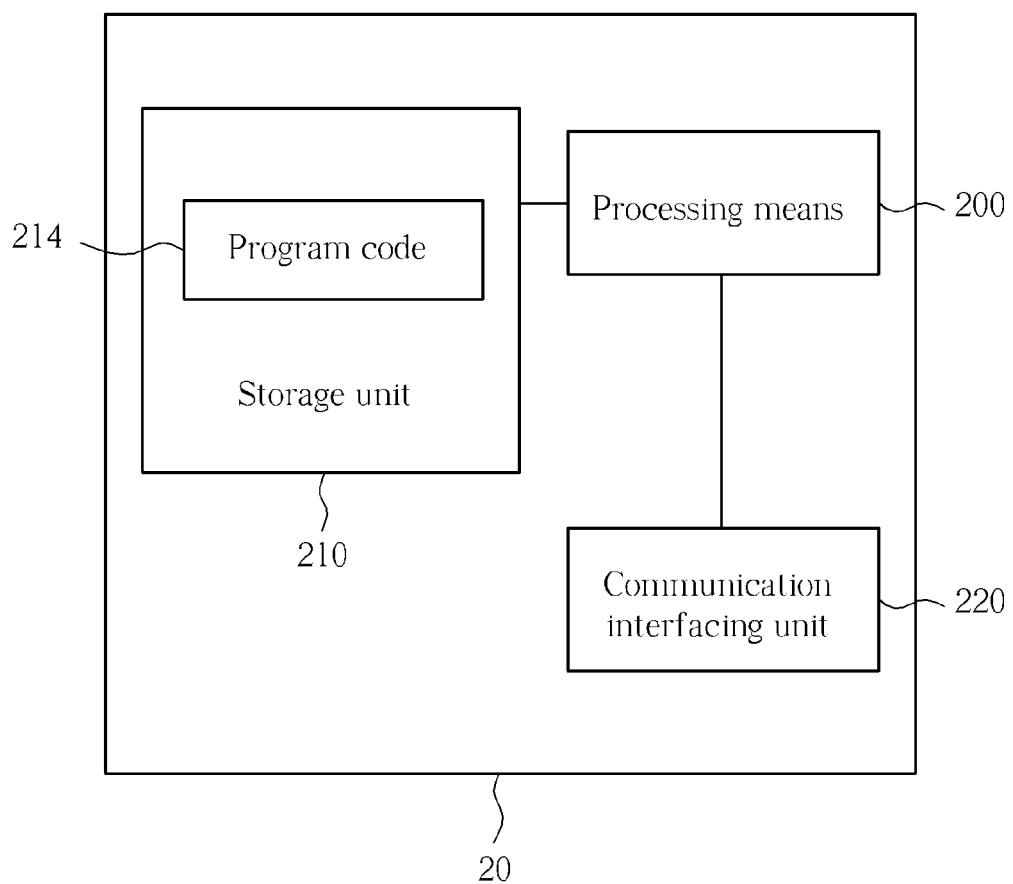
FIG. 2 is a schematic diagram of an exemplary communication device.

Please refer to FIG. 2. FIG. 2 is a schematic diagram of an exemplary communication device 20. The communication device 20 can be the MTC devices 100, the network 110, the MSs 120 or the MTC sever 130 shown in FIG. 1 and may include a processing means 200 such as a microprocessor or ASIC, a memory unit 210, and a communication interfacing unit 220. The memory unit 210 may be any data storage device that can store program code 214 for access by the processing means 200. Examples of the memory unit 410 include but are not limited to a subscriber identity module (SIM), read-only memory (ROM), random-access memory (RAM), CD-ROMs, magnetic tapes, floppy disks, and optical data storage devices. According to processing results of the processing means 200, the communication interfacing unit 220 can be a radio transceiver or a wire/logical link for communicating with the network 110.

Figure 3:
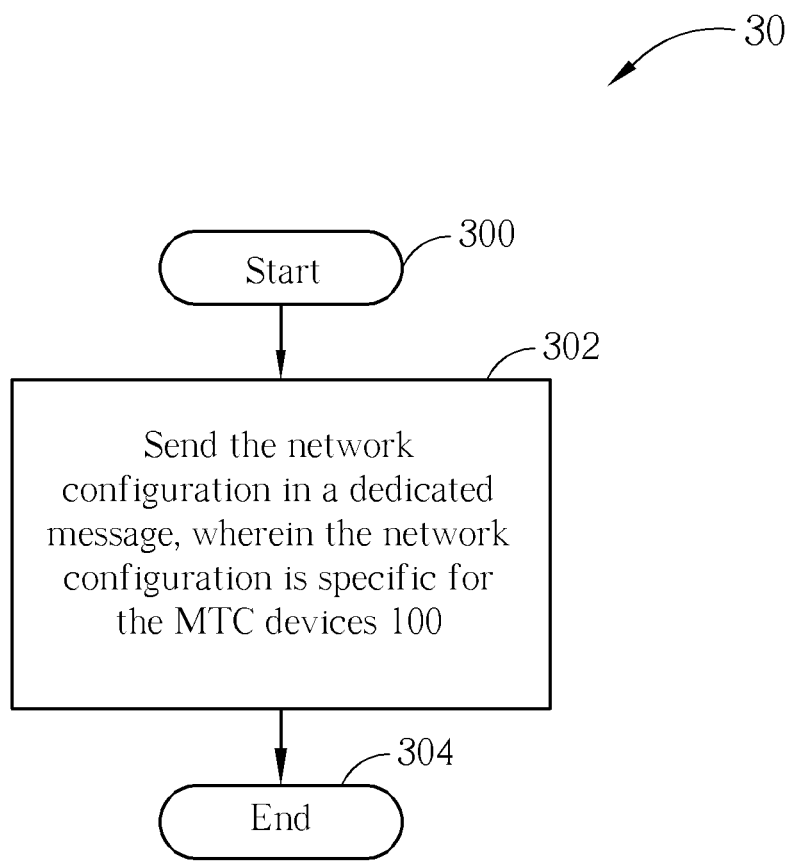
FIG. 3 is a flow chart of an exemplary process.

Please refer to FIG. 3, which is a flow chart of an exemplary process 30. The process 30 is used for sending a network configuration for the network 110 in a wireless communication system 10. The process 30 can be compiled into the program code 214 and includes the following steps:

Step 300: Start.

Step 302: Send the network configuration in a dedicated message, wherein the network configuration is specific for the MTC devices 100.

Step 304: End.

According to the process 30, the network 110 sends the network configuration specific for the MTC devices 100 in the dedicated message. The network 110 may or may not support Network Operation Mode I. The dedicated message may be referred as to an active set update message, a cell update confirm message, a physical channel reconfiguration message, a radio bearer reconfiguration message, a radio bearer release message, a radio bearer setup message, a transport channel reconfiguration message, an UTRAN mobility information message or a HANDOVER TO UTRAN COMMAND message, instructing the MSs 120 to handover or change from the current routing area/radio access technology (RAT) to another routing area/Inter RAT. The network configuration is sent as an information element in a core network (CN) information info element and a CN information info full element in the dedicated message. In other words, the network configuration (e.g. in a form of an information element) is included in the active set update message, cell update confirm message, physical channel reconfiguration message, radio bearer reconfiguration message, radio bearer release message, radio bearer setup message, transport channel reconfiguration message, UTRAN mobility information message or HANDOVER TO UTRAN COMMAND message. Since the network 110 sends the network configuration in the dedicated message, the MS 120 can read the network configuration upon the reception of the dedicated message, regardless of an idle mode or a connected mode. Thus, when the MS 120 in the connected mode hands over to another routing area, the MS 120 obtains the network configuration from the dedicated message and knows if the new routing area supports the same feature for MTC devices 100.

Figure 4:
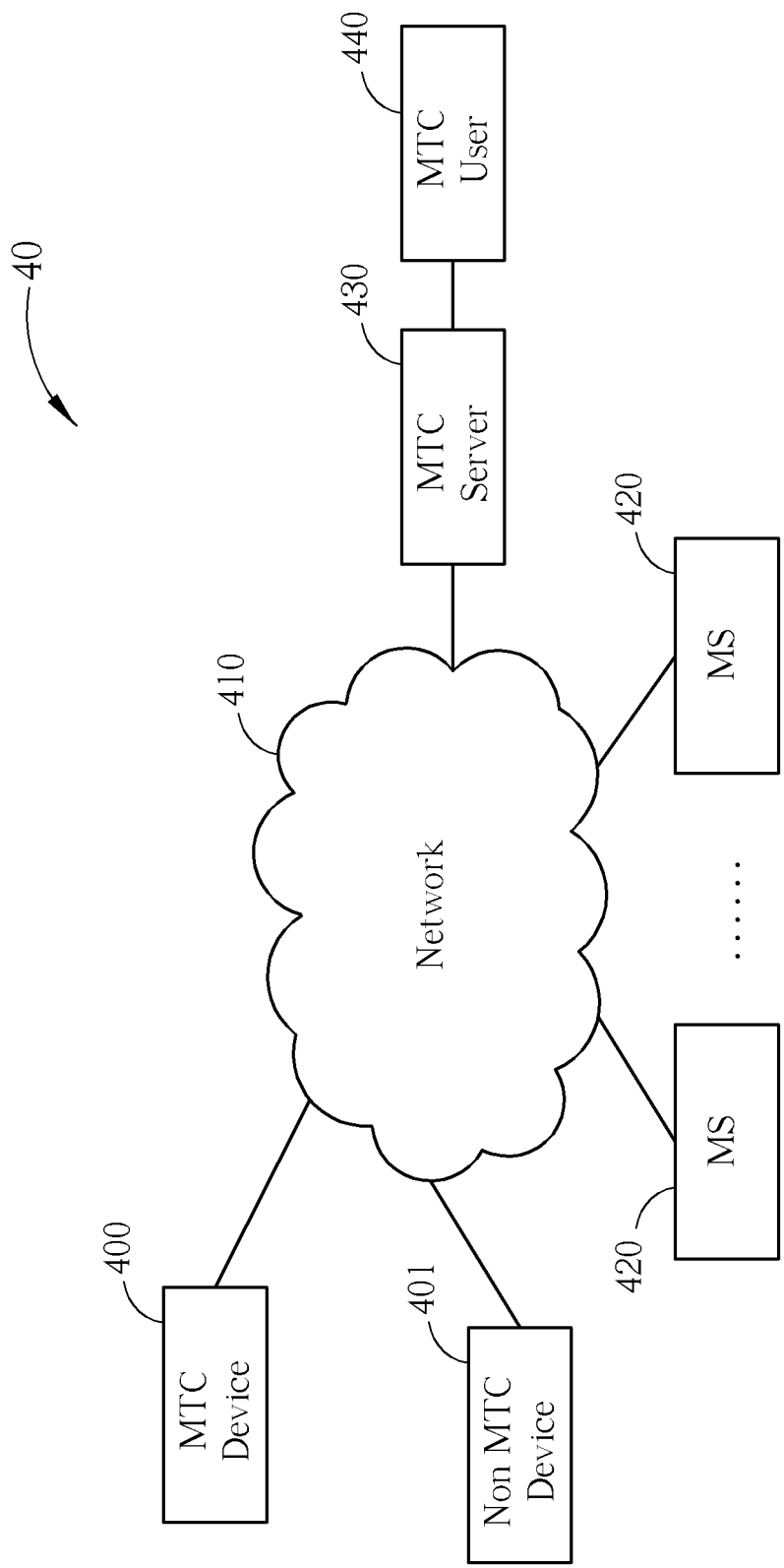
FIG. 4 is another MTC architecture of a wireless communication system.

Take FIG. 4 as an example, FIG. 4 is an exemplary MTC architecture of a wireless communication system 40. The wireless communication system 40 includes a MTC device 400, a non MTC device 401, a network 410, a MS 420, a MTC server 430 and a MTC user 440. The MTC devices 400, non MTC device 401 and the MSs 420 are connected to the network 410. The MTC server 430 receives information of the MTC devices 400 through the network 410, and provides the information to the MTC user 440. The MTC server 430 is located outside of the network 410 or inside of the network 410 and managed by the network operator. The network 410 may support Network Operation Mode II for the non MTC device 401. The MTC device 400 is attached for PS and CS services and sends a measurement report to the network 410 containing measurement information of the neighbouring cell. The network 410 then decides to handover the MS 420 to a cell belonging to another routing area. The network 410 sends configurations about the support of Network Operation Mode I for MTC device 400 in an information element F and the support of Network Operation Mode II for the non MTC device 401 in a dedicated message, such as an ACTIVE SET UPDATE message or a UTRAN MOBILITY INFORMATION message. If the MS 420 supports MTC and receives the information element F in a ACTIVE SET UPDATE or UTRAN MOBILITY INFORMATION, the MS 420 will take action based on the information element F which indicates that new cell supports NMO I. In this situation, the MS 420 supporting MTC performs combined routing area update procedure. If the MS 420 does not support MTC, the MS 420 will perform separate routing area.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results can send a network configuration of a network in the wireless communication system 10.

To sum up, the network sends the network configuration specific for the MTC devices in the dedicated message which instructs the MS to handover or change from the current routing area/RAT to another routing area/Inter RAT. After the network sends the network configuration in the dedicated message, the MS can read system information upon the reception of the dedicated message, regardless of an idle mode or a connected mode. Thus, when the MS in the connected mode hands over to another routing area, the MS obtains the network configuration from the dedicated message and knows if the new routing area supports the same feature for MTC devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of sending a network configuration of a network in a wireless communication system, the method comprising:
   sending the network configuration in a dedicated message to a mobile station (MS) when the MS in a connected mode hands over to another routing area, wherein the network configuration is specific for a machine type communication (MTC) device, and the network configuration is used to indicate a network mode of operation the MTC device;
   wherein the dedicated message instructs the MS to hand over or change from a first radio access technology to a second radio access technology or from a first routing area to a second routing area, and the dedicated message is one of an active set update message, a cell update confirm message, a physical channel reconfiguration message, a radio bearer reconfiguration message, a radio bearer release message, a radio bearer setup message, a transport channel reconfiguration message, an UTRAN mobility information message and a HANDOVER TO UTRAN COMMAND message.

2. The method of claim 1, wherein the network configuration is sent as an information element of core network (CN) information info or CN information info full in the dedicated message.

3. The method of claim 2, wherein the network configuration makes the MS configured to handle the new network mode of operation element treat the network as Network Operation Mode I.

4. A communication device for sending a network configuration in a wireless communication system, the communication device comprising:
   means for sending the network configuration in a dedicated message to a mobile station (MS) when the MS in a connected mode hands over to another routing area, wherein the network configuration is specific for a machine type communication (MTC) device, and the network configuration is used to indicate a network mode of operation for the MTC device;
   wherein the dedicated message instructs the MS to hand over or change from a first radio access technology to a second radio access technology or from a first routing area to a second routing area, and the dedicated message is one of an active set update message, a cell update confirm message, a physical channel reconfiguration message, a radio bearer reconfiguration message, a radio bearer release message, a radio bearer setup message, a transport channel reconfiguration message, an UTRAN mobility information message and a HANDOVER TO UTRAN COMMAND message.

5. The communication device of claim 4, wherein the network configuration is sent as an information element of core network (CN) information info or CN information info full in the dedicated message.

6. The communication device of claim 4, wherein the network configuration makes the MS configured to handle the new network mode of operation element treat the network as Network Operation Mode I.

\* \* \* \* \*